A. N. ANDERSON.
MOWER ATTACHMENT.
APPLICATION FILED JAN. 15, 1914.
1,212,167.
Patented Jan. 16, 1917.
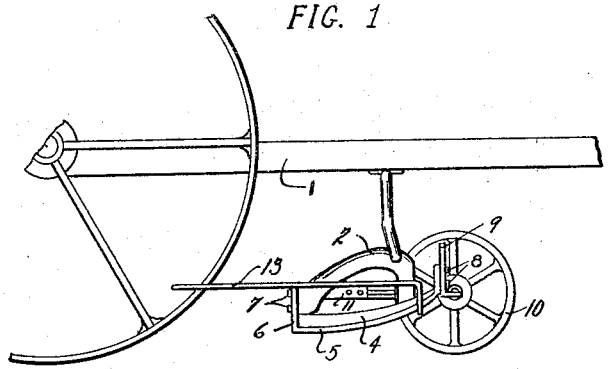
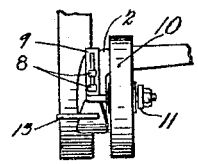
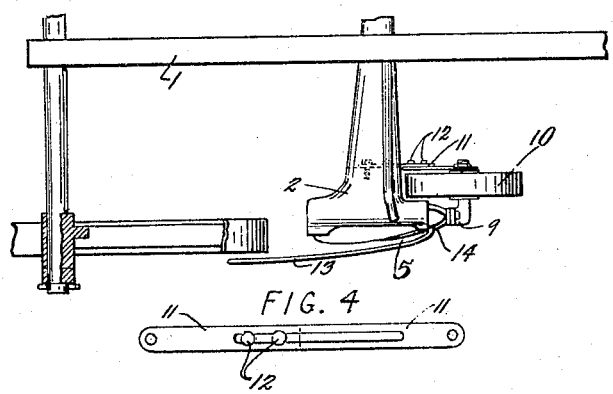
WITNESSES
Otto Melchior
Paul A. Viersen
INVENTOR
Andrew N. Anderson
BY H. Danders
ATTY.

UNITED STATES PATENT OFFICE.

ANDREW N. ANDERSON, OF LARSON, NORTH DAKOTA.

MOWER ATTACHMENT.

1,212,167. Specification of Letters Patent. Patented Jan. 16, 1917.

Application filed January 15, 1914. Serial No. 812,316.

*To all whom it may concern:*

Be it known that I, ANDREW N. ANDERSON, a citizen of the United States, residing at Larson, in the county of Burke and State of North Dakota, have invented certain new and useful Improvements in Mower Attachments, of which the following is a specification.

This invention relates to improvements in mower or buncher attachments and more particularly to a device of this class adapted to be attached to the mower shoe and to the inner end of the guard bar to obviate the side draft of the same and of the sickle. Means for adjusting the sickle bar carrying wheel in a vertical plane are also provided whereby the height of the sickle bar above the ground may be regulated.

With the foregoing and other objects in view the invention consists in the combination and arrangement of parts to be hereinafter fully described in the following specification pointed out in the claim and illustrated in the accompanying drawing which form a part of said specification in which—

Figure 1 is a side elevation of my improved attachment in place upon a mower. Fig. 2 is a plan of the same partly in section. Fig. 3 is a front elevation. Fig. 4 is a detail plan of the adjustable wheel brace used.

Like reference characters indicate corresponding parts throughout the several views.

1 designates the tongue of a mower or buncher provided with the guard bar 2. To attach my improvement to the mower I remove the lower portion of the shoe and attach my device to the remaining or upper portion 4 of the same. My attachment comprises the angular runner 5 secured directly to the base 4 of the shoe and having an angular rear termination 6 bolted as at 7 to the rear end of the guard-bar; the forward end of said runner being angular and adjustably secured by screws 8, 8 to a vertically extending bracket 9 carried by the axle of my auxiliary wheel 10.

11, 11 is an adjustable wheel-brace for the auxiliary wheel and the same comprises two flat longitudinally slotted pieces adjustably connected by the bolts 12 and said brace connects the axle of the wheel 10 with the guard bar 2.

13 is the guard rod which is secured as at 14 to the runner 5 and which extends back to the traction wheels of the mower. The sickle bar is secured at its inner end to the shoe 4 and the guard bar.

If it is desired to raise the sickle bar and the guard bar the same is accomplished by lowering the wheel 10 through the medium of the bracket 9 which is adjustably secured to said runner thereby cutting the grain as near the ground as desired.

What is claimed is:—

An attachment for mowers, including a runner conforming to the base of the mower-shoe, said runner having a rear-end upstanding terminal secured to the guard-bar of the mower, an auxiliary wheel-axle carried bracket, said runner and said bracket having a slot and bolt adjusting connection therebetween, and an adjustable wheel-brace including slidably connected members, one member being connected to the wheel-axle and the other member being connected to said guard bar.

In testimony that I claim the foregoing as my own I have hereto affixed my signature in the presence of the subscribing witnesses.

ANDREW N. ANDERSON.

Witnesses:
  GEO. G. KEUP,
  D. W. BANKOL,
  F. A. KEUP.

Copies of this patent may be obtained for five cents each, by addressing the "Commissioner of Patents, Washington, D. C."